United States Patent [19]

Yamada et al.

[11] Patent Number: 5,297,196
[45] Date of Patent: Mar. 22, 1994

[54] FACSIMILE APPARATUS ADAPTED TO COMMUNICATE VIA AN ACOUSTIC COUPLER

[75] Inventors: Akira Yamada, Shizuoka; Shuichi Suzuki, Numazu; Shunji Akitsu, Shizuoka, all of Japan

[73] Assignee: Tokyo Electric Co., Ltd., Tokyo, Japan

[21] Appl. No.: 856,505

[22] Filed: Mar. 24, 1992

[30] Foreign Application Priority Data

Mar. 25, 1991 [JP] Japan .................. 3-84662

[51] Int. Cl.⁵ .................. H04M 11/00; H04M 1/00
[52] U.S. Cl. .................. 379/99; 379/93; 379/100; 379/444
[58] Field of Search ............ 379/93, 96, 97, 98, 379/99, 100, 444, 375

[56] References Cited

U.S. PATENT DOCUMENTS

| | | | |
|---|---|---|---|
| 4,652,937 | 3/1987 | Shimura et al. | 379/444 |
| 4,849,815 | 7/1989 | Streck | 379/100 |
| 4,901,345 | 2/1990 | Imagawa | 379/100 |
| 4,926,459 | 5/1990 | Advani et al. | 379/375 |
| 5,041,917 | 8/1991 | Koshiishi | 379/100 |

FOREIGN PATENT DOCUMENTS

| | | |
|---|---|---|
| 0283295 | 9/1988 | European Pat. Off. . |
| 0334669 | 9/1989 | European Pat. Off. . |
| 63-36673 | 2/1988 | Japan . |
| 63-285062 | 11/1988 | Japan . |
| 2166024 | 4/1986 | United Kingdom .................. 379/99 |
| 2169174 | 7/1986 | United Kingdom . |

OTHER PUBLICATIONS

Patent Abstracts of Japan, vol. 13, No. 344, Aug. 1989 Communication Equipment, Takayama Tadashi et al. *English Abstracts.

Primary Examiner—Jin F. Ng
Assistant Examiner—Jason Chan
Attorney, Agent, or Firm—Frishauf, Holtz, Goodman & Woodward

[57] ABSTRACT

An information communication apparatus includes acoustic and non-acoustic couplers, a switch for selectively connecting an information sending source of the apparatus to the acoustic or non-acoustic couplers, a setting unit for selectively setting items of a communication characteristic of each of the acoustic and non-acoustic couplers, a memorizing circuit for memorizing communication characteristics each having items the values of which are preset by the setting unit, a connection detector for detecting the connection of the acoustic coupler to a communication line, and an information sending controller. The controller connects the sending source to the acoustic or non-acoustic coupler by the switch in response to the acoustic coupler connection or not connection and controls the information sending according to the acoustic coupler or non-acoustic coupler communication characteristic from the memorizing circuit.

6 Claims, 10 Drawing Sheets

| COMMUNICATION MODE | PARAMETER | PARAMETER VALUE |
|---|---|---|
| WIRE TELEPHONE | INITIAL TRANSMITTING SPEED | 9600 BPS |
| | IMAGE SIGNAL TRANSMITTING LEVEL | -10 dBm |
| | EQUALIZER | 3.6 km |
| MOVABLE TELEPHONE (CELLULAR PHONE) | INITIAL TRANSMITTING SPEED | 4800 BPS |
| | IMAGE SIGNAL TRANSMITTING LEVEL | -6 dBm |
| | EQUALIZER | 0.0 km |
| ACOUSTIC COUPLER | INITIAL TRANSMITTING SPEED | 2400 BPS |
| | IMAGE SIGNAL TRANSMITTING LEVEL | -0 dBm |
| | EQUALIZER | 1.8 km |

FIG. 3

| COMMUNICATION MODE | PARAMETER | PARAMETER VALUE |
|---|---|---|
| WIRE TELEPHONE | INITIAL RECEIVING SPEED | 9600 BPS |
| | EQUALIZER | 3.6 km |
| MOVABLE TELEPHONE (CELLULAR PHONE) | INITIAL RECEIVING SPEED | 4800 BPS |
| | EQUALIZER | 0.0 km |
| ACOUSTIC COUPLER | INITIAL RECEIVING SPEED | 4800 BPS |
| | EQUALIZER | 1.8 km |

```
┌─────────────────────────────────────┐
│ PROCESS OF SETTING VALUES OF        │
│ PARAMETERS, REQUIRED FOR RECEIVING  │
│ INFORMATION IN EACH COMMUNICATION   │
│ MODE                                │
└─────────────────────────────────────┘
                  │
                  ▼
┌─────────────────────────────────────┐
│ OPERATE FUNCTION KEY 34 TO DISPLAY  │
│ "SETTING OF RECEIVING PARAMETER     │
│  VALUE" ON LCD 26                   │
└─────────────────────────────────────┘
                  │
                  ▼
              ╱KEY  ╲    STOP KEY 32
             ╱ INPUT ╲──────────────► (loop back up)
             ╲   ?   ╱
              ╲     ╱
                  │ START KEY 30
                  ▼
┌─────────────────────────────────────┐
│ DISPLAY ON LCD 26 "WIRE TELEPHONE   │
│ MODE", "MOVABLE TELEPHONE MODE" OR  │◄──┐
│ "ACOUSTIC COUPLER MODE"             │   │
└─────────────────────────────────────┘   │
                  │                        │
                  ▼                        │
              ╱KEY  ╲                     ┌──────────────┐
             ╱ INPUT ╲  FUNCTION KEY 34   │CHANGE NAME OF│
             ╲   ?   ╱───────────────────►│MODE,DISPLAYED│
              ╲     ╱                     │ON LCD 26     │
                  │ START KEY 30          └──────────────┘
                  ▼
┌─────────────────────────────────────┐
│ DISPLAY ON LCD 26 PRESENT VALUE     │
│ OF INITIAL RECEIVING SPEED OF       │
│ DISPLAYED MODE                      │
└─────────────────────────────────────┘
           │                    │
          (A)                  (B)
```

FIG. 11

FACSIMILE APPARATUS ADAPTED TO COMMUNICATE VIA AN ACOUSTIC COUPLER

BACKGROUND OF THE INVENTION

1. 1. Field of the Invention

The present invention relates to an information communication apparatus and, more particularly, to an information communication apparatus (i.e., a facsimile apparatus) having information sending means for sending information, acoustic coupler means for transmitting the information to a communication line through sound according to a predetermined communication characteristic including a plurality of items, non-acoustic coupler means for transmitting the information to the communication line through an optical signal or an electric signal according to a predetermined communication characteristic including a plurality of items, connection switching means for selectively connecting the information sending means to the acoustic coupler means or the non-acoustic coupler means, and communication characteristic item setting means for selectively setting a plurality of items of the communication characteristic of the acoustic coupler means and a plurality of items of the communication characteristic of the non acoustic coupler means.

2. Description of the Related Art

As such an information communication apparatus, for example, a portable facsimile apparatus is known. The portable facsimile apparatus uses as a communication line a wire public telephone line and a wireless public telephone line. The wireless public telephone line is known as a car telephone and a portable telephone. The portable facsimile is connected through an acoustic coupler with a receiver of one of a wire telephone, a car telephone and a portable telephone, or is connected through a non-acoustic coupler means of a MODEM with the wire public telephone line or a telephone line in a body of the car telephone or the portable telephone.

However, communication characteristics required for sending information from the information sending means of the portable facsimile apparatus are different in these cases, in the first of which the portable facsimile apparatus is connected through the acoustic coupler means to the wire public telephone line or the wireless public telephone line, in the second of which the portable facsimile apparatus is connected through the non-acoustic coupler means to the wire public telephone line, and in the third of which the portable facsimile apparatus is connected through the non-acoustic coupler means to the wireless public telephone line.

In other words, different values are required in a plurality of items included in the communication characteristics in the above-described various cases, the items being such as an initial transmitting speed, an image signal transmitting level, an equalizer, and an initial receiving speed.

Heretofore, whenever the above-described various cases are altered, it is necessary to newly set the values of all the items of the communication characteristic of the information sending means of the portable facsimile apparatus in response to the new case by the communication characteristic item setting means provided in the portable facsimile apparatus.

These operations are troublesome, and a communication error is generated if information is sent from the information sending means in one of the above-described various cases but under the wrong communication characteristic for one case.

SUMMARY OF THE INVENTION

Accordingly, it is an object of the present invention to provide an information communication apparatus which can immediately and readily set a necessary communication characteristic in response to the type of a communication line to which the apparatus is connected and also in response to the presence or absence of use of the acoustic coupler means or the non-acoustic coupler means in that connection.

In order to achieve the above-described object, an information communication apparatus of this invention comprises: information sending means for sending information; acoustic coupler means for acoustically transmitting the information to a communication line through sound according to a predetermined communication characteristic including a plurality of items; non-acoustic coupler means for non-acoustically transmitting the information to the communication line through an optical signal or an electric signal according to a predetermined communication characteristic including a plurality of items; connection switching means for selectively connecting the information sending means to the acoustic coupler means or the non-acoustic coupler means; communication characteristic item setting means for selectively setting a plurality of items of the communication characteristic of the acoustic coupler means and a plurality of items of the communication characteristic of the non-acoustic coupler means; communication characteristic memorizing means for memorizing a plurality of communication characteristics each having a plurality of items the values of which are preset by the communication characteristic item setting means; acoustic coupler connection detecting means for detecting the connection of the acoustic coupler means to the communication line; and information sending control means for connecting the information sending means to the acoustic coupler means by the connection switching means in response to the detection of the connection of the acoustic coupler means to the communication line by the acoustic coupler connection detecting means, for reading out the communication characteristic of the acoustic coupler means from the communication characteristic memorizing means, and for controlling the sending of the information from the information sending means according to the read out communication characteristic of the acoustic coupler means, and for connecting the information sending means to the non-acoustic coupler means by the connection switching means in response to the non-detection of the connection of the acoustic coupler means to the communication line by the acoustic coupler connection detecting means, for reading out the communication characteristic of the non-acoustic coupler means from the communication characteristic memorizing means and for controlling the sending of the information from the information sending means according to the read out communication characteristic of the non-acoustic coupler means.

When the information communication apparatus according to the present invention and constituted as described above is connected to the wire public telephone line or the wireless public telephone line, the connection switching means connects the information sending means to the acoustic coupler means in response to the detection of the connection of the acoustic coupler means to the communication line by the acoustic coupler connection detecting means. Simultaneously, the communication characteristic of the acoustic coupler means is read out from the plurality of communication characteristics memorized in the communication characteristic memorizing means, and the sending of the information from the information sending means is controlled by the read out communication characteristic.

If the information communication apparatus is connected to the wire public telephone line through the non-acoustic coupler means or is connected to the wireless public telephone line through the non-acoustic coupler means, the information sending means is connected to the non-acoustic coupler means by the connection switching means in response to the non-detection of the connection of the acoustic coupler means to the communication line by the acoustic coupler connection detecting means. Simultaneously, the predetermined communication characteristic of the non-acoustic coupler means is read out from the plurality of communication characteristics memorized in the communication characteristic memorizing means, and the sending of the information from the information sending means is controlled by the read out communication characteristic.

If the read predetermined communication characteristic of the non-acoustic coupler means does not coincide with a predetermined communication characteristic required for the public telephone line (wire or wireless) to which the non-acoustic coupler means is connected, another predetermined communication characteristic for the non-acoustic coupler means is read out from the plurality of communication characteristics memorized in the communication characteristic memorizing means, and the sending of the information from the information sending means can be controlled by another communication characteristic.

As described above, items of each of various communication characteristics required in the information communication using the acoustic coupler means or the information communication using the non-acoustic coupler means are preset by the communication characteristic item setting means, various communication characteristics are memorized in the communication characteristic memorizing means, the various communication characteristics are read from the communication characteristic memorizing means in response to the above-described various cases, and the sending of the information from the information sending means is controlled by the read communication characteristic. Therefore, a necessary communication characteristic can be immediately and readily set in response to the type of the communication line connected with the information communication apparatus, and to the presence or absence of the use of the acoustic coupler means or the non-acoustic coupler means in that connection.

In the information communication apparatus according to the present invention and constituted as described above, it is preferable that the information communication apparatus further comprises display means and dialing mode switching means for switching the dialing mode to the communication line between a pulse dialing mode and a tone dialing mode, and the display means displays a type name of the communication line to which the acoustic coupler means or the non-acoustic coupler means is connected, and which has the dialing mode selected by the dialing mode switching means and the communication characteristic read out from the communication characteristic memorizing means.

The type of the communication line connected with the non-acoustic coupler means includes a wire communication line and a wireless communication line.

In the information communication apparatus according to the present invention and constituted as described above, it is also preferable that the information communication apparatus further comprises a monitor speaker for generating an answer sound from another information communication apparatus connected to the acoustic coupler means through the communication line while the acoustic coupler means is connected to the communication line.

With such arrangement as described above, the user of the information communication apparatus can hear the answer sound from another information communication apparatus connected to the acoustic coupler means while the acoustic coupler means is connected to the communication line. Therefore, the operability of the information communication apparatus is improved.

When the acoustic coupler means is used in the conventional information communication apparatus, the user of the information communication apparatus must call the another information communication apparatus, to which the information will be sent, by the telephone before the acoustic coupler is attached to the receiver of the telephone. Because the conventional information communication apparatus does not have the monitor speaker, the user must attach the acoustic coupler means to the receiver within a predetermined time after the user hears the answer sound from the another information communication apparatus through the receiver of the telephone, and then send the information. Therefore, the user must be familiar with the use of the acoustic coupler, and the operability of the conventional information communication apparatus at the time of using the acoustic coupler means is not good.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 11 and 12 are flowcharts schematically showing a setting process for setting parameter values required to receive information in each of communication modes in the portable facsimile apparatus of the embodiment of FIG. 1.

DETAILED DESCRIPTION OF THE PREFERRED EMBODIMENTS

An embodiment of the present invention will be described in detail with reference to the accompanying drawings.

Figure 1:
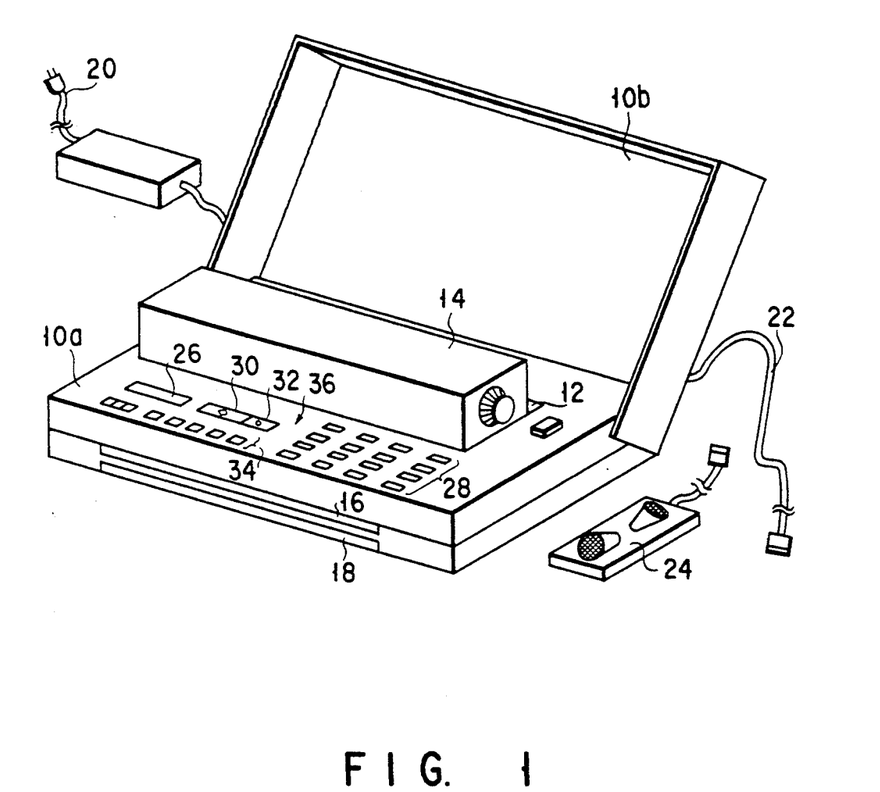
FIG. 1 is a perspective view schematically showing an external appearance of a portable facsimile apparatus according to an embodiment of the present invention.

External Appearance of Portable Facsimile Apparatus of One Embodiment, and Arrangement of Control Unit therein FIG. 1 schematically shows an external appearance of a portable facsimile apparatus according to an embodiment of an information communication apparatus of the present invention.

A housing of the portable facsimile apparatus is formed in a book shape, and has a body housing 10a and a cover 10b openably connected to the body housing 10a. In FIG. 1, the cover 10b is disposed at an open position, and one side surface (upper surface in FIG. 1) of the body housing 10a is exposed. The cover 10b covers the one side surface at its closed position.

A recording sheet insertion slot extended in a right and left direction and an original insertion slot 12 being located at the rear side of the recording sheet insertion slot and extended along the recording sheet insertion slot with being in parallel thereto are formed at the center of the longitudinal direction on the one side surface, and a recording sheet cassette 14 rotatably holding a rolled heat sensitive recording sheet is detachably mounted in the entrance of the recording sheet insertion slot.

A recording sheet discharge slot 16 and an original discharge slot 18 are formed at the front end surface of the body housing 10a and extended horizontally in the right and left direction with being spaced vertically from each other.

An image reading means, a thermal printer, and various electric and electronic parts are contained in the body housing 10a, and the various electric and electronic parts constitutes a control unit. An external power source connection cord 20 including a transformer, a non-acoustic coupler means 22 and an acoustic coupler 24 are detachably connected to the control unit.

The portable facsimile apparatus can use a wire public telephone line and a wireless public telephone line as a communication line, and the wireless public telephone line is known as a car telephone and a portable telephone. When the acoustic coupler 24 is used to transmit and receive information in the portable facsimile apparatus, the acoustic coupler 24 is attached to a telephone receiver of a wire telephone, a car telephone or a portable telephone. When the non-acoustic coupler means 22 is used, the non-acoustic coupler means 22 is connected to the wire public telephone line or a telephone line in the body of the car telephone and the portable telephone.

A liquid crystal display (LCD) 26, ten keys and one-touch keys 28 for inputting telephone number, etc., a start key 30, a stop key 32, a plurality of function keys 34, etc., are disposed on the front end portion of the upper surface of the body housing 10a. These various keys constitute a keyboard 36.

Figure 2:
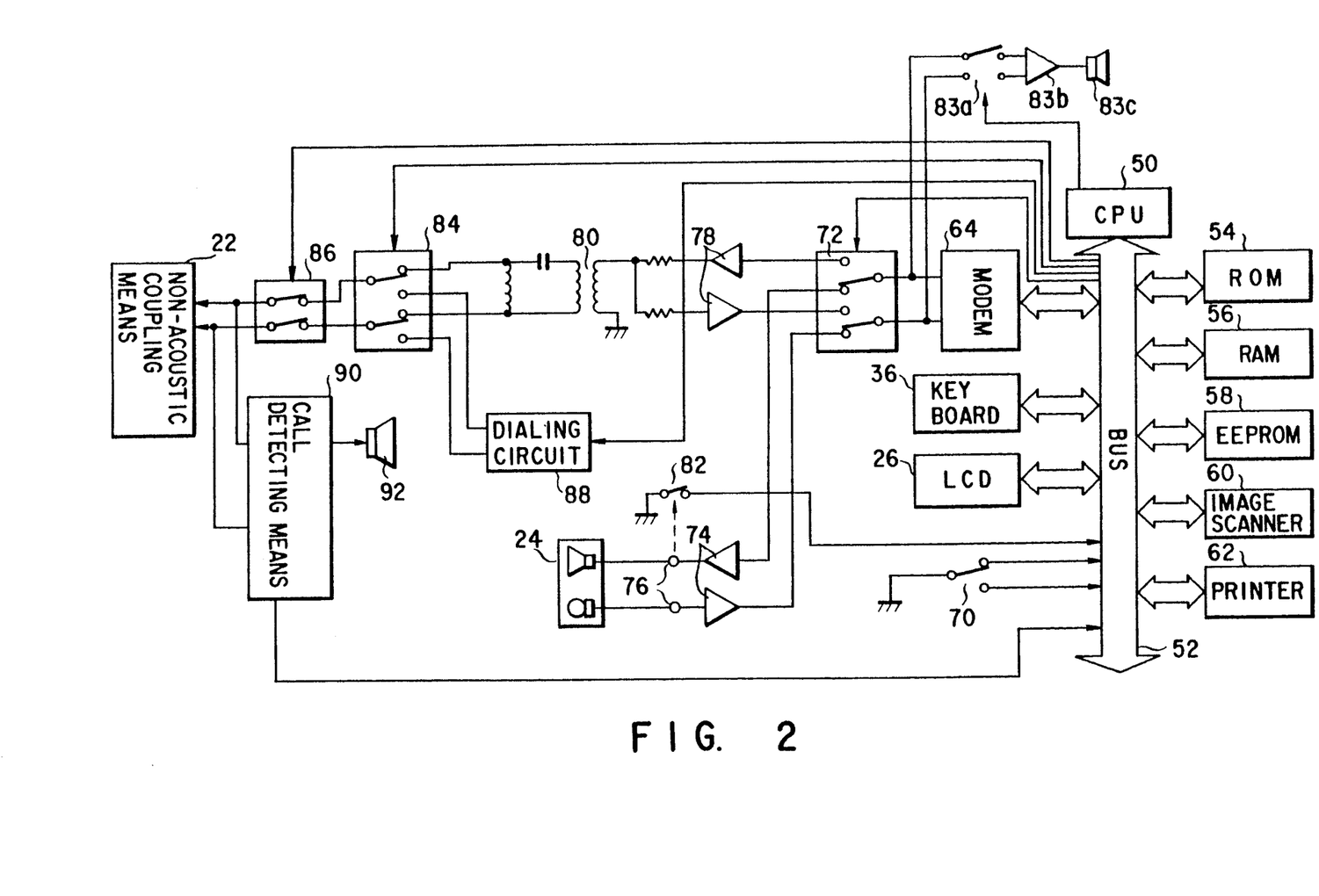
FIG. 2 is a block diagram schematically showing an arrangement of a control unit of the portable facsimile apparatus of the embodiment of FIG. 1.

FIG. 2 schematically shows an arrangement of the control unit of the portable facsimile apparatus of the embodiment.

The control unit has a CPU 50 to which a ROM 54, a RAM 56, an EEPROM (Electrically Erasable and Programmable ROM) 58, an image scanner 60 as image reading means, a thermal printer 62, a MODEM 64, the above described keyboard 36, the above described liquid crystal display 26, and a dialing method switching means 70 are connected through a BUS 52.

A first relay 72 as connection switching means is connected to the MODEM 64, and the first relay 72 in accordance with a command from the CPU 50, switches the connection of the MODEM 64 between an acoustic coupler circuit connected to acoustic coupler connection terminals 76 through an amplifier 74 and a non-acoustic coupler circuit connected to the non-acoustic coupler means 22 through an amplifier 78 and a transformer 80.

An acoustic coupler connection detecting means 82 for detecting the presence or absence of the connection of the acoustic coupler 24 to the acoustic coupler connection terminals 76 is further connected to the acoustic coupler connection terminals 76 in the acoustic coupler circuit. The acoustic coupler connection detecting means 82 transmits a signal for detecting the presence or absence of the connection of the acoustic coupler 24 to the acoustic coupler connection terminals 76 to the CPU 50 through the BUS 52.

A monitor speaker 83c is connected through a monitor speaker ON/OFF relay 83a and an amplifier 83b between the MODEM 64 and the first relay 72. The monitor speaker ON/OFF relay 83a is turned on by the CPU 50 when the CPU 50 receives an acoustic coupler connection signal from the acoustic coupler connection detecting means 82.

The dialing mode switching means 70 connected to the BUS 52 of the above-described control unit makes the control unit selectively use two dialing modes or methods (a pulse mode or method in a dial telephone; a tone mode or method in a push-botton phone or key-touch phone) determined in response to the type of the present telephone.

Second and third relays 84 and 86 are interposed between the transformer 80 and the non-acoustic coupler means 22 in the non-acoustic coupler circuit. In the second relay 84, a dialing circuit 88 is branched from the non-acoustic coupler circuit, and the second relay 84 is operated between two connecting positions according to a command from the CPU 50. As shown in FIG. 2, the second relay 84 being at its first position connects the transformer 80 with the third relay 86, and interrupts the connection between the non-acoustic coupler circuit and the dialing circuit 88, and being at its second position connects the dialing circuit 88 to the non-acoustic coupler circuit and interrupts the connection between the transformer 80 and the third relay 86.

The dialing circuit 88 makes dialing designated on the basis of the command from the CPU 50 while the second relay 84 is in the second position. By the way, this dialing is executed by using pulse signal or tone signal in accordance with a selection by the dialing method switching means 70.

The third relay 86 opens or closes the connection between the second relay 84 and the non-acoustic coupler means 22 in response to a command from the CPU 50. As shown in FIG. 2, call signal detecting means 90 is connected in parallel with the non-acoustic coupler circuit between the third relay 86 and the non-coupler means 22.

A monitor speaker 92 is connected to the call signal detecting means 90. The call signal detecting means 90 is further connected to the CPU 50 through the BUS 52.

When the call signal detecting means 90 detects a call signal from a line switching unit through the non-acoustic coupler means 22, the call signal detecting means 90 generates a ring sound from the monitor speaker 92. The call signal detecting means 90 also transmits a detection signal to the CPU 50 through the BUS 52.

Figure 3:
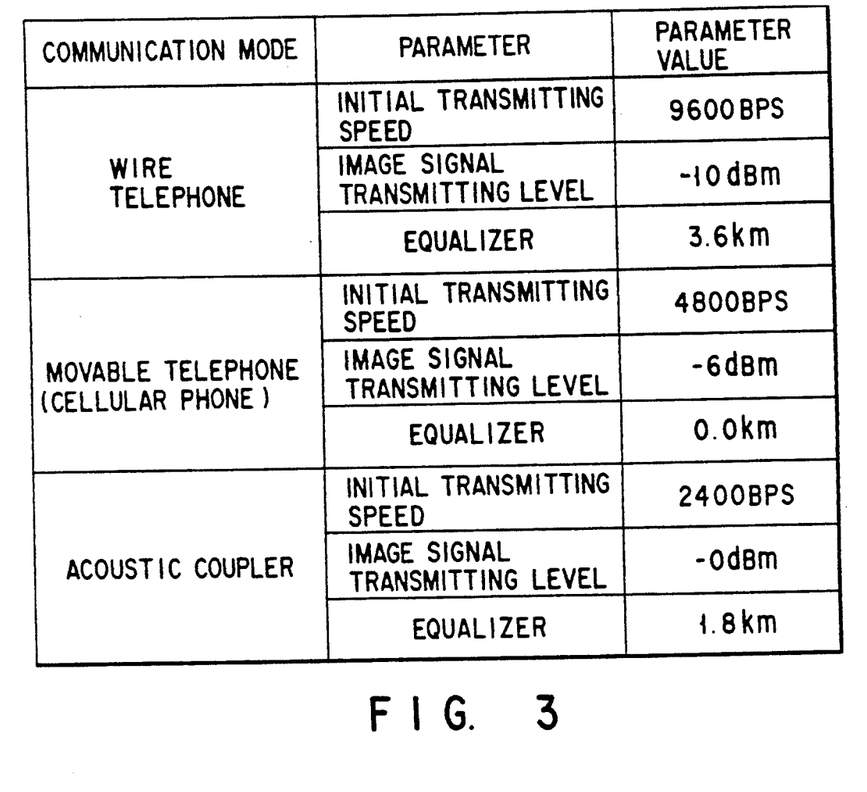
FIG. 3 is a table showing the types of settable communication modes in the portable facsimile apparatus of the embodiment of FIG. 1, parameters (items) of communication characteristics required in Japan for information transmission in the communication modes, and the values thereof.

FIG. 3 shows the types of communication modes being settable in the portable facsimile apparatus of the embodiment, the parameters (items) of communication characteristics required in Japan to transmit information in the communication modes, and the values thereof.

In FIG. 3, the "wire telephone mode" is the case that the portable facsimile apparatus of the embodiment is connected to the wire public telephone line through the non-acoustic coupler means 22. The "movable telephone (cellular phone) mode" is the case that the portable facsimile apparatus of the embodiment is connected to a telephone line in the body of the car telephone or the portable telephone through the non-acoustic coupler means 22. Further, the "acoustic coupler mode" is the case that the portable facsimile apparatus of the embodiment is connected to the receiver of the wire telephone, the car telephone or the portable telephone through the acoustic coupler 24.

Figure 4:
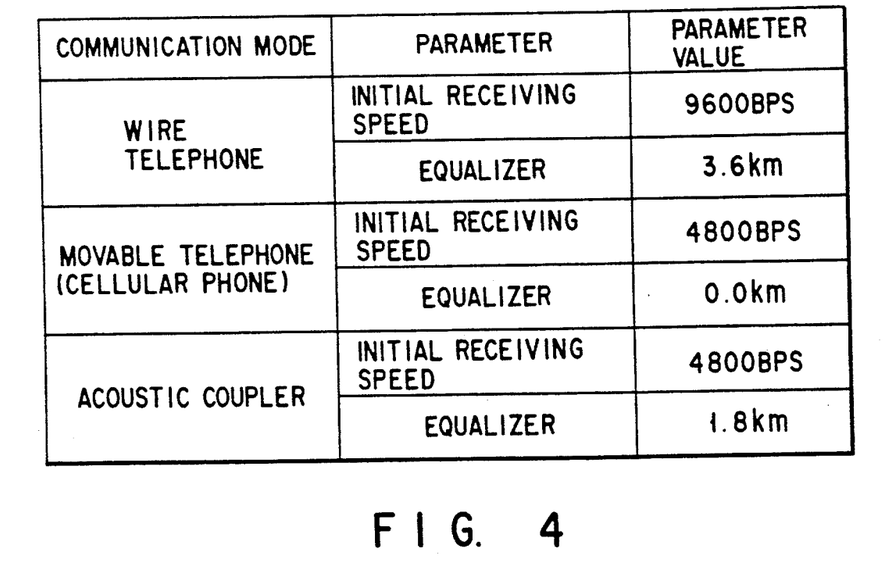
FIG. 4 is a table showing the types of settable communication modes in the portable facsimile apparatus of the embodiment of FIG. 1, parameters (items) of communication characteristics required in Japan for information reception in the communication modes, and the values thereof.

FIG. 4 shows the types of communication modes being settable in the portable facsimile apparatus of the embodiment, the parameters (items) of communication characteristics required in Japan to receive information in the communication modes, and the values thereof.

Desired values in a plurality of parameters (items) of the communication characteristics in a plurality of communication modes shown in FIGS. 3 and 4 are stored previously in the RAM 56 of the control unit by a process described later in more detail, and the storage of the RAM 56 is backed up by an electric backup power source (not shown) contained in the body housing 10b of the portable facsimile apparatus of the embodiment.

Using Process of Portable Facsimile Apparatus of One Embodiment

Then, the using process of the portable facsimile apparatus, in which the control unit is constituted as shown in FIG. 2, of the one embodiment of the present invention will be schematically described with reference to the flowcharts of FIGS. 5 and 6.

At first, the portable facsimile apparatus is connected to the public telephone line by using the acoustic coupler 24 or the non-acoustic coupler means 22. In this embodiment, the acoustic coupler 24 is attached to the receiver of the telephone before any operation is executed in the portable facsimile apparatus.

A plurality of function keys 34 in the keyboard 36 of the body housing 10b are operated to display "communication mode selection" on the LCD 26 adjacent to the keyboard 36. Then, the start key 30 in the keyboard 36 is pressed.

Setting of Acoustic Coupler Mode

When the acoustic coupler 24 is connected to the acoustic coupler connection terminals 76, the CPU 50 which receives a connection detecting signal from the acoustic coupler connection detecting means 82 is prepared by the ROM 54 to make the portable facsimile apparatus of the embodiment transmit and receive information in the communication characteristic of the above-described acoustic coupler mode. At this time, the first relay 72 interrupts the communication line for the non-acoustic coupler means 22 and connects the communication line for the acoustic coupler 24 to the MODEM 64. The "acoustic coupler mode" is displayed on the LCD 26. A dialing mode or method (a tone method) to be used in the acoustic coupler mode is also displayed on the LCD 26, and the CPU 50 is prepared by the ROM 54 to dial by the displayed dialing method. Since only the tone dialing mode or method can be used in the acoustic coupler mode, the dialing mode or method switching means 70 is automatically switched to a tone dialing method selecting portion by the CPU 50 receiving the connection detecting signal from the acoustic coupler connection detecting means 82.

When the start key 30 is finally pressed again, a preparation for transmitting and receiving information between the portable facsimile apparatus of the embodiment and another facsimile apparatus under the communication characteristic of the above-described acoustic coupler mode and the dialing method (tone method) selected as described above.

More specifically, the acoustic coupler mode is set as a communication mode in the portable facsimile apparatus.

Transmission of Information in Acoustic Coupler Mode

Then, an information transmitting process in the acoustic coupler mode, not shown in the flowcharts of FIGS. 5 and 6, will be described.

When an image of an original is transmitted from the portable facsimile apparatus to another facsimile apparatus by using the acoustic coupler 24 (i.e., by the acoustic coupler mode) after the above preparation has been completed, at first the acoustic coupler 24 is attached to the receiver of the telephone and then an original is inserted into the original insertion slot 12 in the upper surface of the body housing 10a. And, when a telephone number of another facsimile apparatus is input by a dial key of the telephone or by the ten keys or the one-touch key 28 in the body housing of the portable facsimile apparatus, another facsimile apparatus is called through its telephone number by the predetermined communication characteristic as shown in FIGS. 3 and 4 of the acoustic coupler mode and the dialing method selected as described above.

When the acoustic coupler 24 receives an answer signal from the another facsimile apparatus, a monitor sound corresponding to the detected answer signal is generated from the monitor speaker 83c for the acoustic coupler circuit, and the start key 30 is pressed to start the information transmission after the monitor sound is generated, the detection signal corresponding to an information receiving start signal from the another facsimile apparatus is transmitted from the MODEM 64 to the CPU 50 through the BUS 52.

The CPU 50 which received the detection signal makes the original move from the original insertion slot 12 in the body housing 10a of the portable facsimile apparatus to the original discharge slot 18, and makes the image scanner 60 in the body housing 10a read the image on the moving original. The read image is converted to a transmission signal corresponding to the predetermined communication characteristic of the above-described acoustic coupler mode by the MODEM 64, and is transmitted to the another facsimile apparatus through the acoustic coupler 24.

Reception of Information in Acoustic Coupler Mode

Then, an information reception process in the acoustic coupler mode, not shown in the flowcharts of FIGS. 5 and 6, will be described.

When a receiving side operator is called from a transmission side operator through the telephone or vise versa and gives a notice that an information transmission by a facsimile is executed to the receiving side operator, the receiving side operator attaches the acoustic coupler 24 to the receiver of the telephone and connects the acoustic coupler 24 to the acoustic coupler connection terminals 76. Further, the receiving side operator presses the start key 30 of the facsimile apparatus.

When the acoustic coupler 24 of the portable facsimile apparatus of the embodiment receives an information transmission starting signal from the another facsimile apparatus after the above-described preparation has been completed, a monitor sound corresponding to the detected information transmission starting signal is generated from the monitor speaker 83c for the acoustic coupler circuit, and simultaneously the detection signal corresponding to the information transmission starting signal is transmitted form the MODEM 64 to the CPU 50 through the BUS 52.

The CPU 50 which received the above-described detection signal makes a heat sensitive recording sheet move from the recording sheet cassette 14 toward the recording sheet discharge slot 16 at a predetermined speed in the body housing 10b, and then records the image on the heat sensitive recording sheet by the thermal printer 62 in the body housing 10b on the basis of the image signal sent subsequent to the information transmission starting signal from the another facsimile apparatus.

Setting of Wire Telephone Mode or Movable Telephone Mode

Then, returning to the flowcharts of FIGS. 5 and 6, the case that the wire telephone mode or the movable telephone mode is set as a communication mode in the portable facsimile apparatus of the embodiment will be described.

Figure 5:
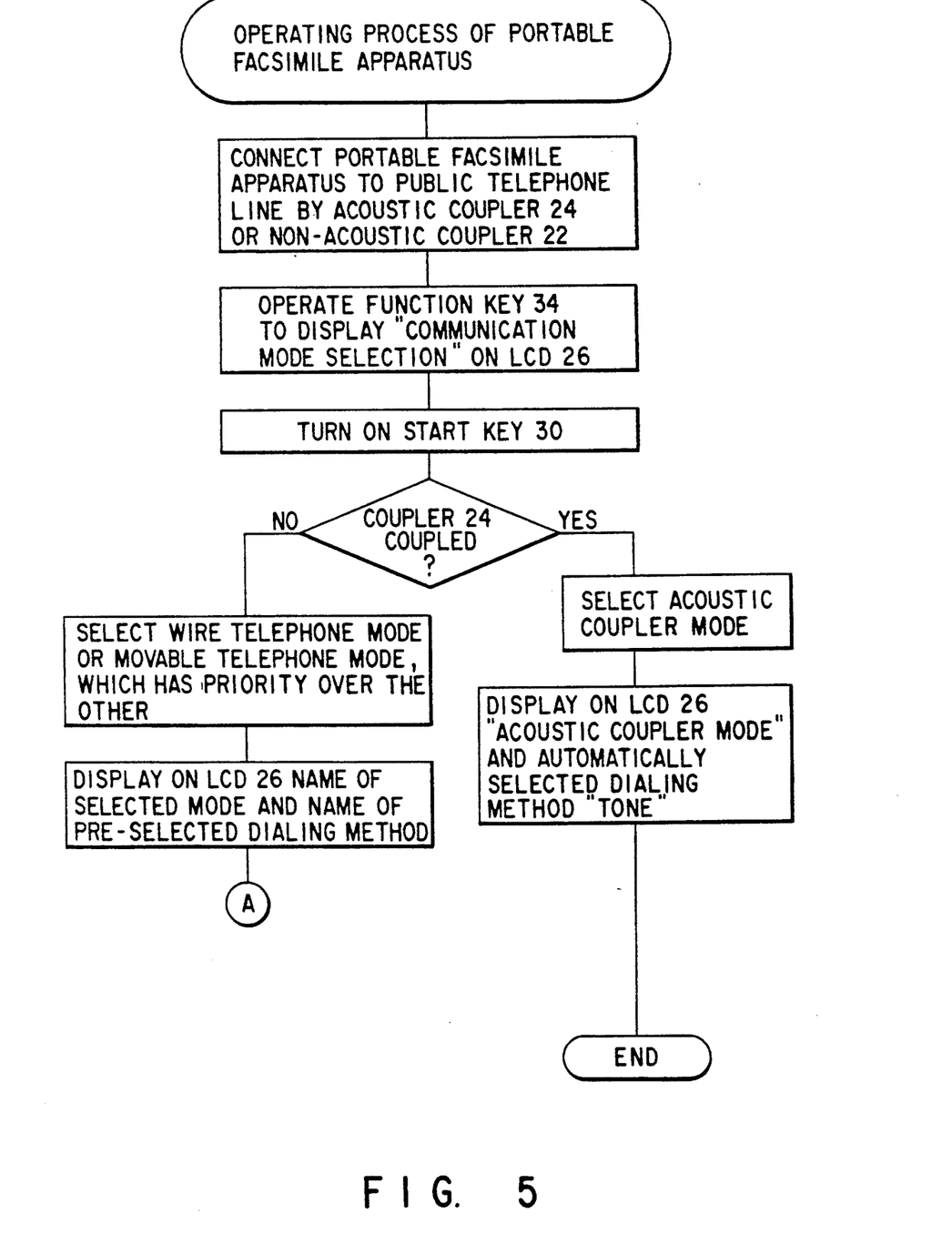
FIGS. 5 and 6 are flowcharts schematically showing an operating process of the portable facsimile apparatus of the embodiment of FIG. 1.
Figure 6:
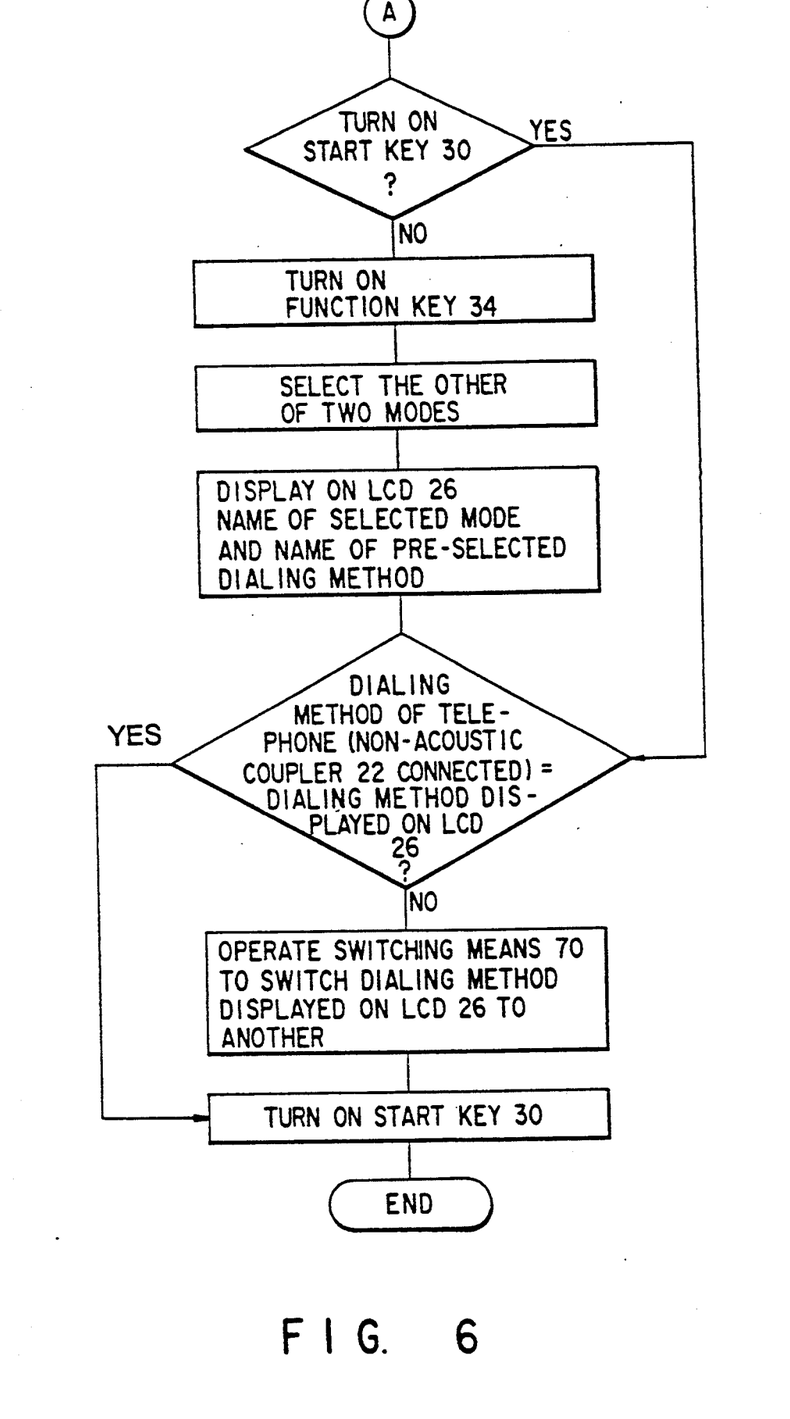

When the "communication mode selection" is displayed on the LCD 26 of the body housing 10b by operating a plurality of function keys 34 in the keyboard 36 of the body housing 10b, as shown in the flowchart of FIG. 5, after the portable facsimile apparatus of the embodiment is connected to the public telephone line by using the non-acoustic coupler means 22, and then the start key 30 in the keyboard 36 is further pressed, the CPU 50 which does not receive the connection detection signal from the acoustic coupler connection detecting means 82 is prepared by the ROM 54 to make the portable facsimile apparatus of the embodiment to transmit and receive information in the communication characteristic of the above-described wire telephone mode or movable telephone (cellular phone) mode. The priority order for setting any of the above-described two modes is predetermined. At this time, the first relay 72 interrupts the communication line for the acoustic coupler 24 and connects the communication line for the non-acoustic coupler means 22 to the MODEM 64. And, the monitor speaker ON/OFF relay 83a for the acoustic coupler circuit is turned off. Either the "wire telephone mode" or the "movable telephone or cellular phone mode" firstly selected from the above-described two modes is displayed on the LCD 26. Either dialing method (a pulse method or a tone method) firstly selected is further displayed on the LCD 26 at the same time, and the CPU 50 is prepared by the ROM 54 to perform the dialing operation by the dialing method displayed on the LCD 26. This dialing method is either one of the above-described two types selected by the dialing method switching means 70.

When any mode firstly selected from the above-described two modes coincides with the mode required for the telephone connected to the non-acoustic coupler means 22, the start key 30 is pressed. Then, when the dialing method displayed on the LCD 26 coincides with the dialing method firstly selected from the above-described two modes, the communication mode set in the portable facsimile apparatus of the embodiment is established by finally pressing the start key 30.

If any mode firstly selected from the above-described two modes does not coincide with the mode required for the telephone connected with the non-acoustic coupler means 22, the remaining mode of the above-described two modes is set by pressing the function key 34 in place of the start key 30, and is, together with the dialing method selected, displayed on the LCD 26. If the dialing method displayed on the LCD 26 does not coincide with the dialing method used for the remaining mode of the above-described two modes, the dialing method can be altered to another dialing method by the dialing method switching means 70. When the start key 30 is finally pressed, the communication mode set in the portable facsimile apparatus is established.

Transmission of Information in Wire Telephone Mode or Movable Telephone Mode

Then, the information transmission process in the wire telephone mode or the movable telephone mode not shown in the flowcharts of FIGS. 5 and 6 will be described.

In order to transmit an image of an original from the portable facsimile apparatus to another facsimile apparatus by using the non-acoustic coupler means 22 (i.e., by the wire telephone mode or the movable telephone mode) after the above preparation has been completed, an original is inserted into the original insertion slot 12 in the upper surface of the body housing 10a, and a telephone number of another facsimile apparatus is input by the ten keys or the one-touch key 28. This telephone number is displayed on the LCD 26, and the second relay 84 is connected to the dialing circuit 88 and the third relay 86 connects the second relay 84 to the non-acoustic coupler means 22 (i.e., another facsimile apparatus) as soon as the telephone number is input by the one-touch key or by further pressing the start key 30 when the telephone number is input by the ten keys. Then, another facsimile apparatus is called through its telephone number by the dialing circuit 88 in accordance with the predetermined communication characteristic shown in FIGS. 3 and 4 of the communication mode selected from the wire telephone or movable telephone modes and the dialing method selected as described above.

After dialing the telephone number of another facsimile apparatus, the second relay 84 interrupts its connection to the dialing circuit 88 and connects the non-acoustic coupler means 22 (that is, another facsimile apparatus) to the transformer 80 and the MODEM 64.

When the MODEM 64 receives an information receive starting signal from the another facsimile apparatus, the MODEM 64 transmits the detection signal corresponding to the information receive starting signal to the CPU 50 through the BUS 52.

The CPU 50 which receives the detection signal converts image information read from the original in the body housing 10a to a transmission signal corresponding to the predetermined communication characteristic of the communication mode selected as described above by the MODEM 64, and transmits the transmission signal to the another facsimile through the non-acoustic coupler means 22.

Reception of Information in Wire Telephone Mode or Movable Telephone Mode

Then, the information reception process in the wire telephone mode or the movable telephone mode not shown in the flowcharts of FIGS. 5 and 6 will be described.

When the portable facsimile apparatus connected through the non-acoustic coupler means 22 to another facsimile apparatus is called by the telephone number from the another facsimile apparatus, a monitor sound corresponding to the call signal detected by the call signal detecting means 90 is generated from the monitor speaker 92, and simultaneously the detection signal corresponding to the detection of the call signal is transmitted from the speaker 92 to the CPU 50 through the BUS 52.

The CPU 50 which receives the above-described detection signal connects the non-acoustic coupler means 22 to the transformer 80 by the second and third relays 84 and 86. Simultaneously, the CPU 50 records the image signal on the heat sensitive recording sheet by the thermal printer 62 in the body housing 10b on the basis of the image signal transmitted thereto on the heel of the call signal from the another facsimile apparatus.

Selection of Setting Order in Wire Telephone Mode and Movable Telephone Mode

Figure 7:
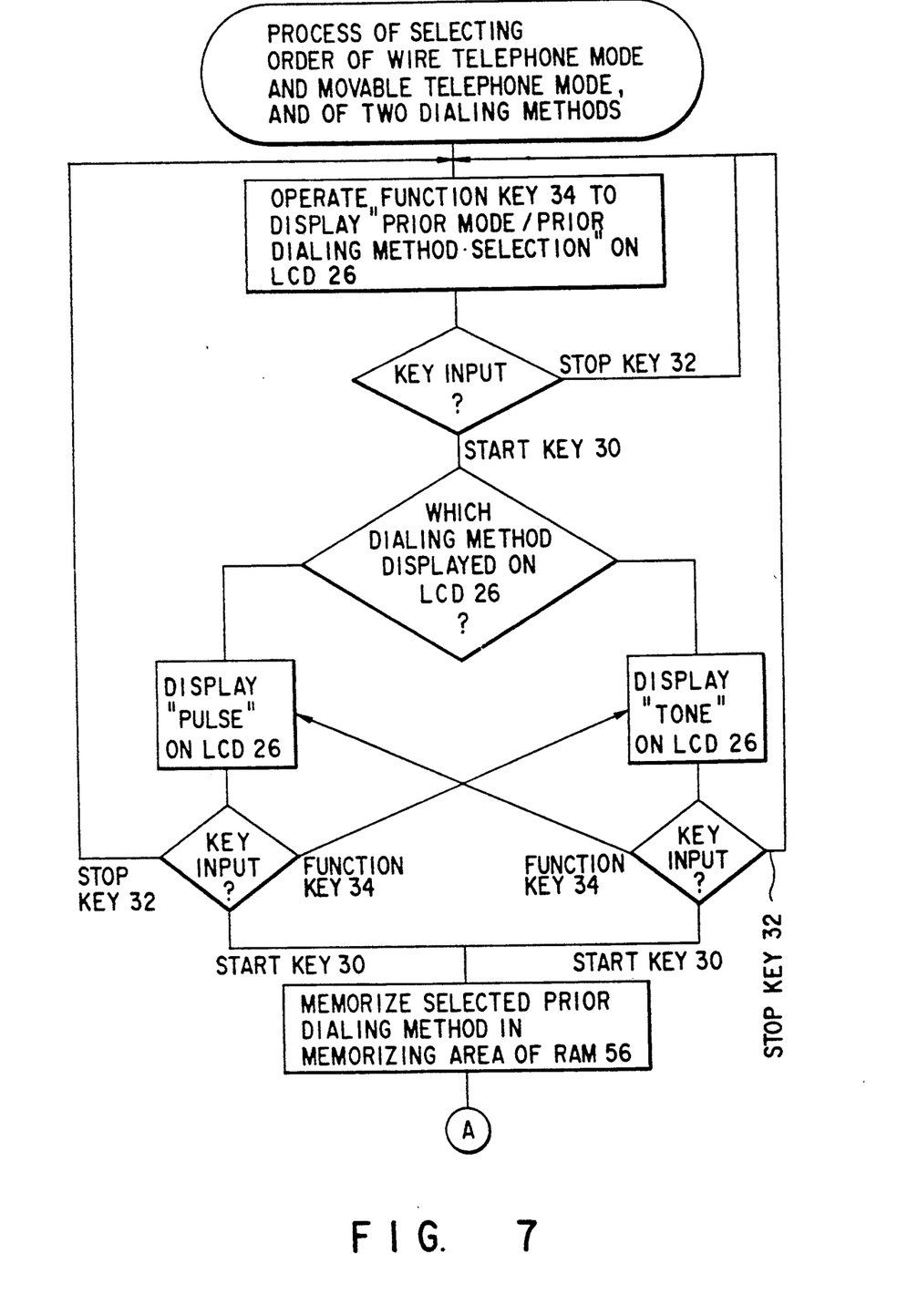
FIGS. 7 and 8 are flowcharts schematically showing a selecting process of a priority in a setting order between a wire telephone mode and a movable telephone mode when either one of the modes is set in the portable facsimile apparatus of the embodiment of FIG. 1.
Figure 8:
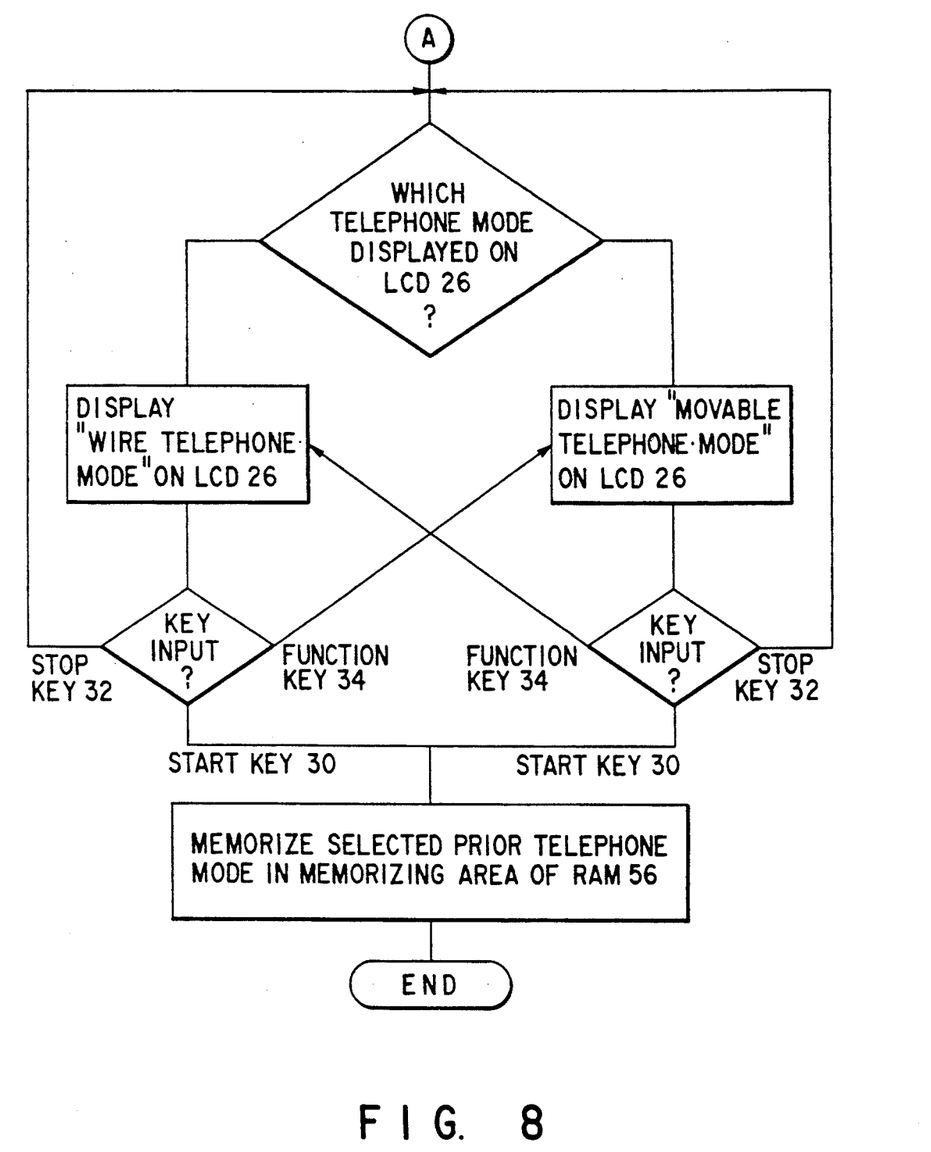

Then, a process of selecting order of the wire telephone mode and the movable telephone mode when these modes are set in the portable facsimile apparatus of the embodiment will be described with reference to the flowcharts of FIGS. 7 and 8.

First, the function keys 34 of the keyboard 36 on the body housing 10b of the portable facsimile apparatus of the embodiment is operated to display the "prior mode/prior dialing method selection" on the LCD 26.

Then, when the start key 30 is pressed, the name of the dialing method (pulse method or tone method) set at present in the prior dialing method memorizing area of the RAM 56 is displayed on the LCD 26. If the displayed dialing method is used as the prior setting dialing method, the start key 30 is pressed to memorize the displayed dialing method in the prior dialing method memorizing area of the RAM 56. If another dialing method different from the displayed dialing method is used as the prior setting dialing method, the function key 34 is operated to display the name of another dialing method on the LCD 26, the start key 30 is further pressed to memorize the displayed another dialing method in the prior dialing method memorizing area of the RAM 56.

When the start key 30 for memorizing the prior setting dialing method is pressed, the name of the communication mode (wire telephone mode or movable telephone mode) set at present in the prior mode memorizing area of the RAM 56 is displayed on the LCD 26. If the displayed communication mode is used as the prior communication mode, the start key 30 is pressed to memorize the displayed communication mode in the prior mode memorizing area of the RAM 56. If the different communication mode from the displayed communication mode is used as the prior communication mode, the function key 34 is operated to display the name of another communication mode on the LCD 26, the start key 30 is further pressed to memorize the another communication mode displayed in the prior mode memorizing area of the RAM 56.

Setting of Values of Parameters, Required for Transmitting information in each Communication Modes As described in detail above, in the portable facsimile apparatus of the embodiment, the values of parameters required for transmitting information in the wire telephone mode, the movable telephone (cellular phone) mode and the acoustic coupler mode are set prior to the actual use of the portable facsimile apparatus.

Figure 9:
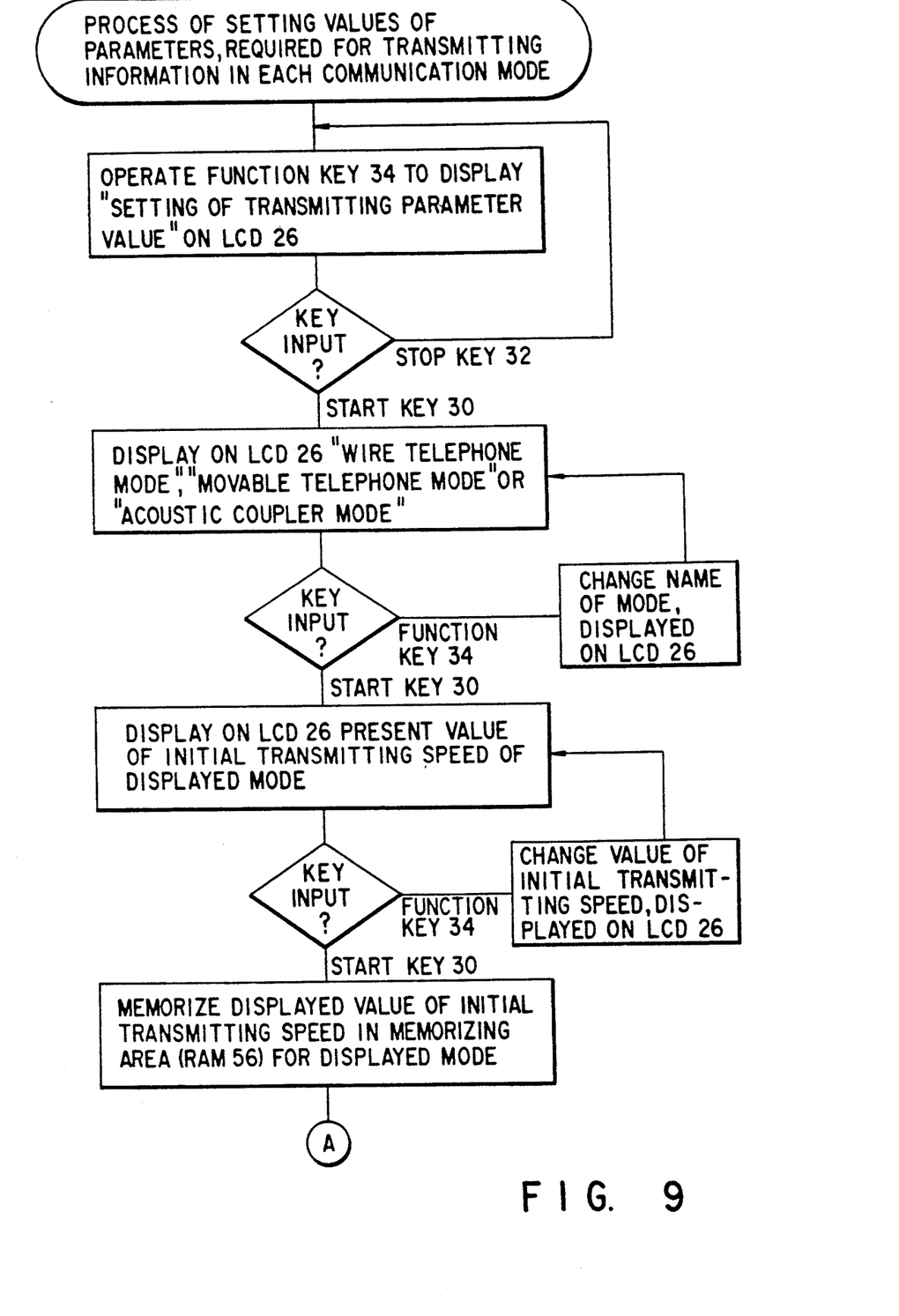
FIGS. 9 and 10 are flowcharts schematically showing a setting process for setting parameter values required to transmit information in each of communication modes in the portable facsimile apparatus of the embodiment in FIG. 1.
Figure 10:
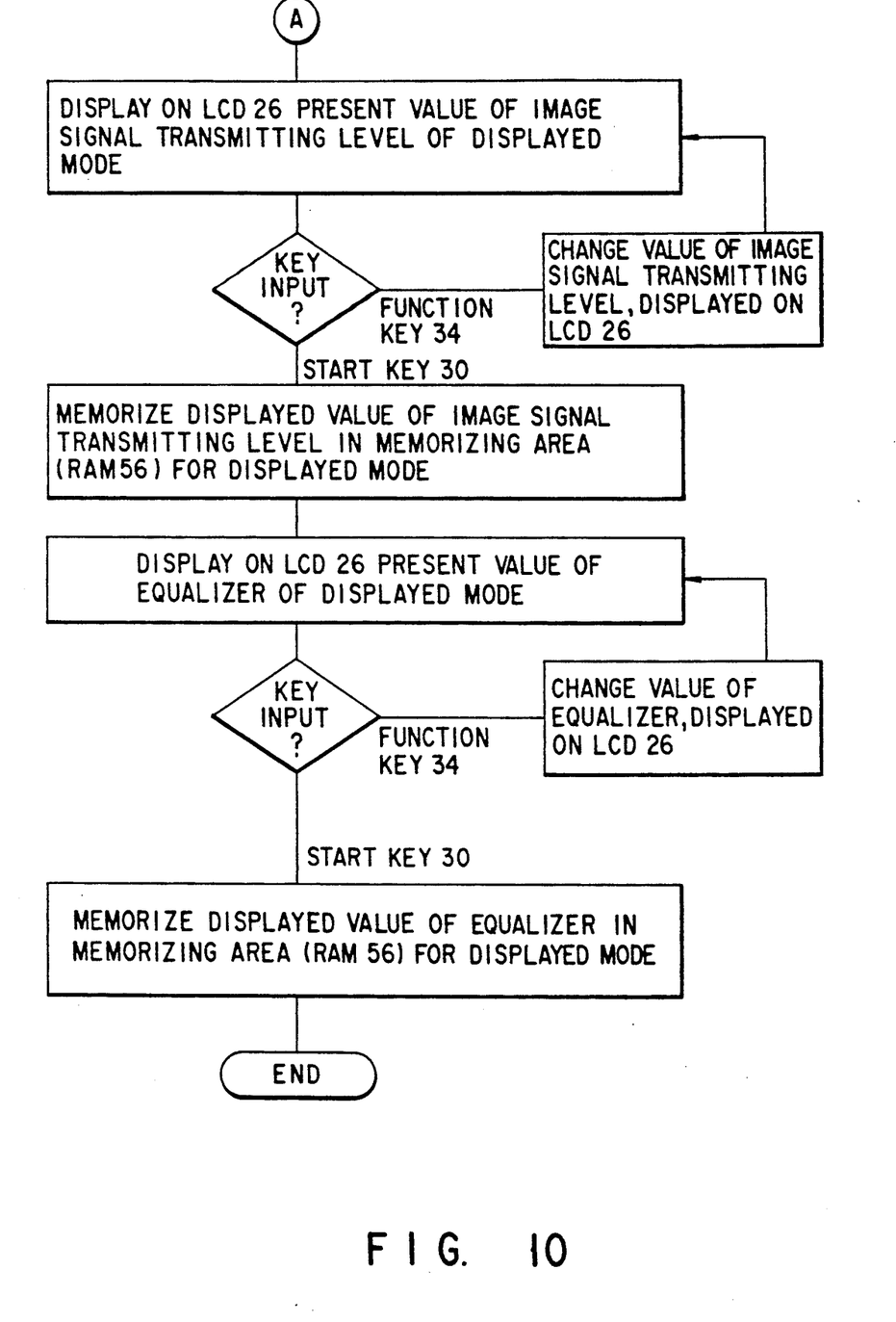

Then, the process of setting the values of the respective parameters required for transmitting information in these various modes will be described with reference to FIGS. 9 and 10.

First, the function keys 34 in the keyboard 36 of the body housing 10b are operated to display the "setting of transmitting parameter value" on the LCD 26.

Then, when the start key 30 is pressed, any one of "wire telephone mode", "movable telephone mode" and "acoustic coupler mode" is displayed on the LCD 26. At this time, if the function keys 34 are operated, the name of the above-described communication mode displayed on the LCD 26 can be altered. If the start key 30 is again pressed when the name of the desired communication mode is displayed on the LCD 26, the value of the initial transmitting speed set at present in the desired communication mode displayed on the LCD 26 is firstly displayed.

At this time, if the function keys 34 are operated, the value of the initial transmitting speed displayed on the LCD 26 can be altered. When the start key 30 is pressed, the value of the initial transmitting speed displayed on the LCD 26 is memorized in the initial transmitting speed memorizing area for the selected communication mode of the RAM 56, and the value of the image signal transmitting level set at present in the desired communication mode displayed on the LCD 26 is displayed.

At this time, if the function keys 34 are operated, the value of the image signal transmitting level displayed on the LCD 26 can be altered. Further, the start key 30 is pressed, the value of the image signal transmitting level displayed on the LCD 26 is memorized in the image signal transmitting level memorizing area of the RAM 56 for the selected communication mode, and the value of an equalizer set at present in the desired communication mode displayed on the LCD 26 is displayed.

At this time, if the function keys 34 are operated, the value of the equalizer displayed on the LCD 26 can be altered. Further, the start key 30 is pressed, the value of the equalizer displayed on the LCD 26 is memorized in the equalizer memorizing area of the RAM 56 for the selected communication mode.

Setting of Values of Parameters Required for Receiving Information in each Communication Mode In the portable facsimile apparatus of the embodiment, the values of parameters required for receiving information in the wire telephone mode, the movable telephone (cellular phone) mode and the acoustic coupler mode are set prior to the actual use of the portable facsimile apparatus.

Figure 11:
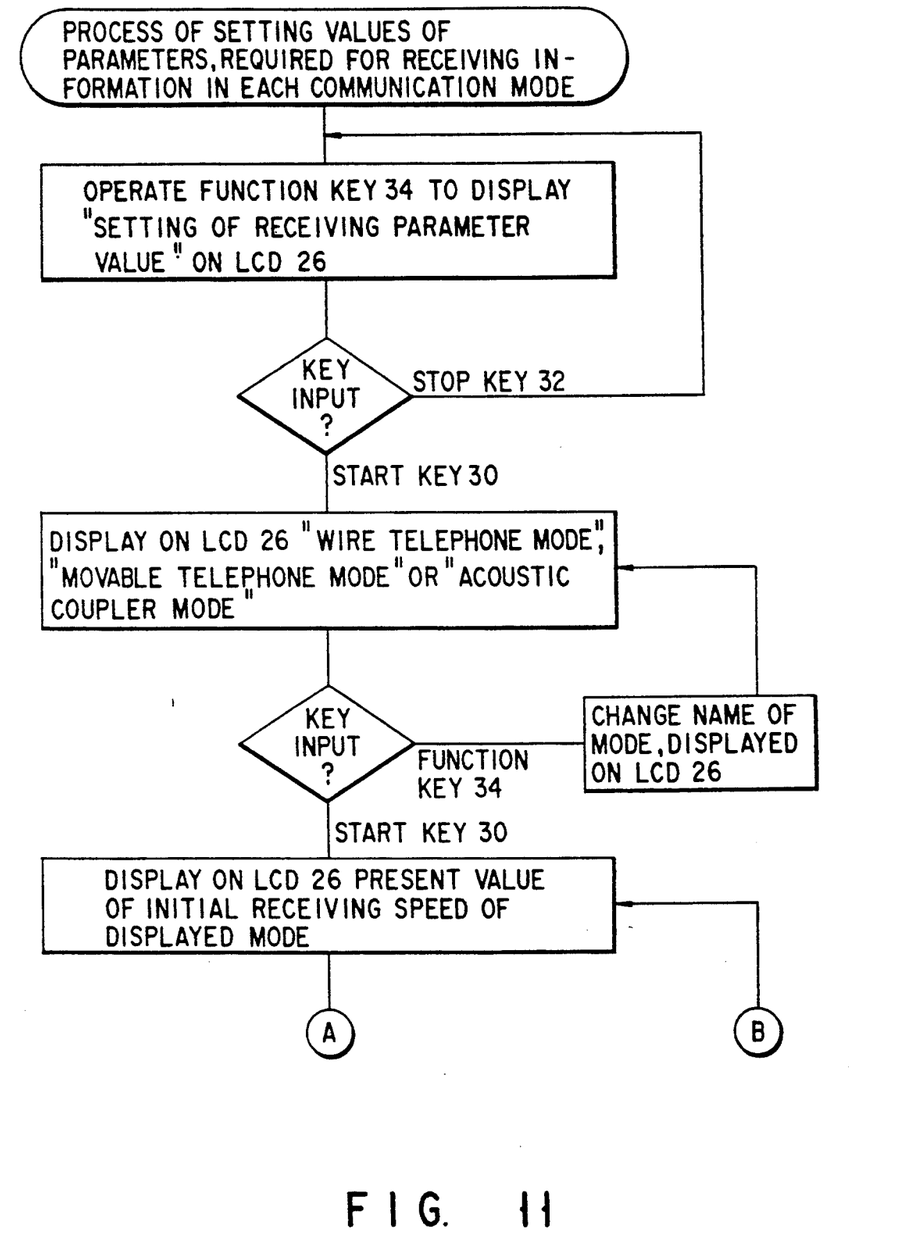

Then, the process of setting the values of the respective parameters required for receiving information in these various communication modes will be described with reference to FIGS. 11 and 12.

First, the function keys 34 in the keyboard 36 of the body housing 10b are operated to display the "setting of receiving parameter value" on the LCD 26.

Then, when the start key 30 is pressed, any one of "wire telephone Mode", "movable telephone mode" and "acoustic coupler Mode" is displayed on the LCD 26. At this time, if the function keys 34 are operated, the name of the above-described communication mode displayed on the LCD 26 can be altered. If the start key 30 is again pressed when the name of the desired communication mode is displayed on the LCD 26, the value of the initial receiving speed set at present in the desired communication mode displayed on the LCD 26 is firstly displayed.

At this time, if the function keys 34 are operated, the value of the initial receiving speed displayed on the LCD 26 can be altered. When the start key 30 is pressed, the value of the initial receiving speed displayed on the LCD 26 is memorized in the initial receiving speed memorizing area of the RAM 56 for the selected communication mode, and the value of the equalizer set at present in the desired communication mode displayed on the LCD 26 is displayed.

At this time, if the function keys 34 are operated, the value of the equalizer displayed on the LCD 26 can be altered. Further, if the start key 30 is pressed, the value of the equalizer displayed on the LCD 26 is memorized in the equalizer memorizing area for the selected communication mode of the RAM 56.

Additional advantages and modification will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information communication apparatus for communicating information by facsimile, comprising:
   information sending means for sending information;
   acoustic coupler means for acoustically transmitting the information to a communication line through sound according to a predetermined communication characteristic including a plurality of items;
   non-acoustic coupler means for non-acoustically transmitting the information to the communication line according to a predetermined communication characteristic including a plurality of items;
   connection switching means for selectively connecting said information sending means to one of said acoustic coupler means and said non-acoustic coupler means;
   communication characteristic item setting means for selectively setting a plurality of items of the communication characteristic of said acoustic coupler means and a plurality of items of the communication characteristic of said non-acoustic coupler means;
   communication characteristic memorizing means for memorizing a plurality of communication characteristics each having a plurality of items the values of which are preset by said communication characteristic item setting means;
   acoustic coupler connection detecting means for detecting a connection of said acoustic coupler means to the communication line; and
   information sending control means for:
   (a) connecting said information sending means to said acoustic coupler means by said connection switching means in response to the detection of the connection of said acoustic coupler means to the communication line by said acoustic coupler connection detecting means, for reading out the communication characteristic of said acoustic coupler means from said communication characteristic memorizing means, and for controlling the sending of the information from said information sending means according to the read out communication characteristic of said acoustic coupler means, and for
   (b) connecting said information sending means to said non-acoustic coupler means by said connection switching means in response to a non-detection of the connection of said acoustic coupler means to the communication line by said acoustic coupler connection detecting means, for reading out the communication characteristic of said non-acoustic coupler means from said communication characteristic memorizing means, and for controlling the sending of the information from said information sending means according to the read out communication characteristic of said non-acoustic coupler means.

2. An information communication apparatus according to claim 1, further comprising:
   display means; and
   dialing mode switching means for switching a dialing mode to the communication line between a pulse dialing mode and a tone dialing mode; and
   wherein said display means displays a type name of the communication line to which one of said acoustic coupler means and said non-acoustic coupler means is connected, and which has the dialing mode selected by said dialing mode switching means and the communication characteristic read out from said communication characteristic memorizing means.

3. An information communication apparatus according to claim 2, wherein the communication line connected with said non-acoustic coupler means includes one of a wire communication line and a wireless communication line.

4. An information communication apparatus according to claim 1, further comprising:
a monitor speaker for generating an answer sound from another information communication apparatus connected to said acoustic coupler means through the communication line while said acoustic coupler means is connected to the communication line.

5. An information communication apparatus according to claim 4, further comprising:
display means; and
dialing mode switching means for switching a dialing mode to the communication line between a pulse dialing mode and a tone dialing mode; and
wherein said display means displays a type name of the communication line to which one of said acoustic coupler means and said non-acoustic coupler means is connected, and which has the dialing mode selected by said dialing mode switching means and the communication characteristic read out from said communication characteristic memorizing means.

6. An information communication apparatus according to claim 5, wherein the communication line connected with said non-acoustic coupler means includes one of a wire communication line and a wireless communication line.

* * * * *